(12) United States Patent
Dreval et al.

(10) Patent No.: US 11,743,280 B1
(45) Date of Patent: Aug. 29, 2023

(54) IDENTIFYING CLUSTERS WITH ANOMALY DETECTION

(71) Applicant: INTUIT INC., Mountain View, CA (US)

(72) Inventors: Liran Dreval, Tel Aviv (IL); Yiftach Elgat, Rehovot (IL)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 17/877,817

(22) Filed: Jul. 29, 2022

(51) Int. Cl.
H04L 9/40 (2022.01)

(52) U.S. Cl.
CPC ........ H04L 63/1425 (2013.01); H04L 63/102 (2013.01)

(58) Field of Classification Search
USPC .................................................. 726/4, 22–25
See application file for complete search history.

(56) References Cited

U.S. PATENT DOCUMENTS

| | | | | |
|---|---|---|---|---|
| 7,458,508 B1 * | 12/2008 | Shao | ...................... | G06Q 20/04 235/380 |
| 9,177,344 B1 * | 11/2015 | Singh | .................. | G06F 16/2465 |
| 9,355,007 B1 * | 5/2016 | Eicher | ................. | G06F 11/0751 |
| 9,516,039 B1 * | 12/2016 | Yen | ..................... | H04L 63/1425 |
| 10,110,616 B1 * | 10/2018 | Xie | ..................... | H04L 63/1425 |
| 10,361,802 B1 * | 7/2019 | Hoffberg-Borghesani | .................. | G06F 3/00 |
| 10,803,458 B1 * | 10/2020 | Vokes | ................ | G06Q 20/4012 |
| 10,873,794 B2 * | 12/2020 | Kulshreshtha | ........ | H04L 41/064 |
| 10,938,845 B2 * | 3/2021 | Elsner | ...................... | G06N 7/01 |
| 11,128,636 B1 * | 9/2021 | Jorasch | .................. | A61B 5/369 |
| 11,140,171 B1 * | 10/2021 | Friedman | .............. | H04L 9/0861 |
| 11,349,857 B1 * | 5/2022 | Shah | .................... | G06F 16/2379 |
| 11,647,030 B2 * | 5/2023 | Medalion | ............... | G06N 20/00 726/23 |
| 2002/0099649 A1 * | 7/2002 | Lee | .................... | G06Q 20/4016 705/38 |

(Continued)

OTHER PUBLICATIONS

Cao et al.; Uncovering Large Groups of Active Malicious Accounts in Online Social Networks; ACM; (Year: 2014).*

(Continued)

*Primary Examiner* — Kambiz Zand
*Assistant Examiner* — Mahabub S Ahmed
(74) *Attorney, Agent, or Firm* — FERGUSON BRASWELL FRASER KUBASTA PC

(57) ABSTRACT

A method identifying clusters with anomaly detection. The method includes aggregating a set of events, of a user, to generate a user vector in response to identifying an event of the set of events. The method further includes aggregating a set of user vectors to a periodic vector for a time period. The method further includes processing a set of periodic vectors to generate a periodic distance. The method further includes selecting the time period, corresponding to the periodic vector, using the periodic distance and a threshold. The method further includes processing the set of user vectors to generate clusters of user vectors, wherein the set of user vectors includes the event during the time period. The method further includes processing the clusters of user vectors to identify a selected cluster and performing an action to a set of user accounts corresponding to the selected cluster.

20 Claims, 6 Drawing Sheets

(56) References Cited

U.S. PATENT DOCUMENTS

| | | | | |
|---|---|---|---|---|
| 2005/0278542 | A1* | 12/2005 | Pierson | H04L 63/0876 |
| | | | | 713/182 |
| 2007/0043657 | A1* | 2/2007 | Koenigsman | G06Q 40/00 |
| | | | | 705/38 |
| 2007/0192865 | A1* | 8/2007 | Mackin | G06F 21/55 |
| | | | | 726/24 |
| 2009/0044279 | A1* | 2/2009 | Crawford | G06F 21/6218 |
| | | | | 726/26 |
| 2009/0083184 | A1* | 3/2009 | Eisen | H04L 63/1408 |
| | | | | 705/50 |
| 2009/0089869 | A1* | 4/2009 | Varghese | G06Q 20/4014 |
| | | | | 726/7 |
| 2009/0106179 | A1* | 4/2009 | Friedlander | G06N 5/04 |
| | | | | 706/46 |
| 2010/0169192 | A1* | 7/2010 | Zoldi | G06Q 20/4016 |
| | | | | 705/30 |
| 2011/0196791 | A1* | 8/2011 | Dominguez | G06Q 40/00 |
| | | | | 705/44 |
| 2012/0278886 | A1* | 11/2012 | Luna | H04L 63/1408 |
| | | | | 726/22 |
| 2013/0031599 | A1* | 1/2013 | Luna | H04W 12/128 |
| | | | | 726/1 |
| 2013/0054628 | A1* | 2/2013 | Meierhoefer | G06Q 30/0241 |
| | | | | 707/758 |
| 2013/0145418 | A1* | 6/2013 | Stein | G06F 21/56 |
| | | | | 726/1 |
| 2013/0232045 | A1* | 9/2013 | Tai | G06Q 10/10 |
| | | | | 705/35 |
| 2014/0040152 | A1* | 2/2014 | Fang | G06Q 50/01 |
| | | | | 705/319 |
| 2014/0150100 | A1* | 5/2014 | Gupta | G06F 21/316 |
| | | | | 726/22 |
| 2014/0317734 | A1* | 10/2014 | Valencia | G06F 21/552 |
| | | | | 726/22 |
| 2015/0019273 | A1* | 1/2015 | Grosz | G06Q 10/02 |
| | | | | 705/5 |
| 2015/0101053 | A1* | 4/2015 | Sipple | H04L 63/1425 |
| | | | | 726/24 |
| 2015/0310196 | A1* | 10/2015 | Turgeman | H04W 12/06 |
| | | | | 726/19 |
| 2016/0203316 | A1* | 7/2016 | Mace | G06F 21/316 |
| | | | | 726/23 |
| 2016/0253672 | A1* | 9/2016 | Hunter | G06Q 40/06 |
| | | | | 705/39 |
| 2016/0381026 | A1* | 12/2016 | Silva Pinto | H04W 12/08 |
| | | | | 726/4 |
| 2017/0103203 | A1* | 4/2017 | Sharma | G06F 16/285 |
| 2017/0201588 | A1* | 7/2017 | Schmidt | H04L 63/105 |
| 2018/0033089 | A1* | 2/2018 | Goldman | H04L 63/102 |
| 2018/0167402 | A1* | 6/2018 | Scheidler | G06N 20/00 |
| 2018/0218369 | A1* | 8/2018 | Xiao | G06Q 20/20 |
| 2018/0219759 | A1* | 8/2018 | Brown | G06Q 10/109 |
| 2018/0359270 | A1* | 12/2018 | Chari | H04L 63/102 |
| 2018/0375886 | A1* | 12/2018 | Kirti | H04L 41/28 |
| 2019/0098037 | A1* | 3/2019 | Shenoy, Jr. | H04L 63/1441 |
| 2019/0116193 | A1* | 4/2019 | Wang | G06N 20/00 |
| 2019/0122220 | A1* | 4/2019 | Phillips | G06K 19/06037 |
| 2019/0340615 | A1* | 11/2019 | Hanis | G06N 5/02 |
| 2020/0128047 | A1* | 4/2020 | Biswas | H04L 67/10 |
| 2020/0195669 | A1* | 6/2020 | Karasaridis | H04L 63/10 |
| 2020/0259852 | A1* | 8/2020 | Wolff | G06N 7/01 |
| 2020/0278970 | A1* | 9/2020 | Istomin | G06F 16/2379 |
| 2020/0336503 | A1* | 10/2020 | Xu | H04L 63/1425 |
| 2021/0200955 | A1* | 7/2021 | Ben Kimon | G06N 3/044 |
| 2021/0211462 | A1* | 7/2021 | Birch | H04L 63/0236 |
| 2021/0216893 | A1* | 7/2021 | Roden | G06N 5/04 |
| 2022/0086179 | A1* | 3/2022 | Levin | G06F 16/285 |
| 2022/0318819 | A1* | 10/2022 | Sidler | G06N 20/10 |

OTHER PUBLICATIONS

Xiao et al.; Detecting Clusters of Fake Accounts in Online Social Networks; ACM (Year: 2015).*

Stringhini, et al.; Detecting Communities of Malicious Accounts on Online Services; 24th USENIX Security Symposium Aug. 12-14, 2015 (Year: 2015).*

Feng et al.; GroupFound: An effective approach to detect suspicious accounts in online social networks; International Journal of Distributed Sensor Networks (Year: 2019).*

Gianluca Stringhini, et al.; EvilCohort: Detecting Communities of Malicious Accounts on Online Services ; 24th USENIX Security Symposium Aug. 12-14, 2015 • Washington, D.C. ISBN 978-1-939133-11-3 (Year: 2015).*

* cited by examiner

IDENTIFYING CLUSTERS WITH ANOMALY DETECTION

BACKGROUND

Analysis of events of computing systems is used to identify anomalous events that may identify the health of computing systems and malicious activity. Models may be trained on past events to recognize future occurrences of anomalous events. A challenge is that models trained with known anomalies from past events may not detect new anomalies when event patterns change.

SUMMARY

In general, in one or more aspects, the disclosure relates to a method that identifies clusters with anomaly detection. The method includes aggregating a set of events, of a user, to generate a user vector in response to identifying an event of the set of events. The method further includes aggregating a set of user vectors to a periodic vector for a time period, wherein the set of user vectors includes the user vector. The method further includes processing a set of periodic vectors to generate a periodic distance, wherein the set of periodic vectors includes the periodic vector. The method further includes selecting the time period, corresponding to the periodic vector, using the periodic distance and a threshold. The method further includes processing the set of user vectors to generate clusters of user vectors, wherein the set of user vectors includes the event during the time period. The method further includes processing the clusters of user vectors to identify a selected cluster and performing an action to a set of user accounts corresponding to the selected cluster.

In general, in one or more aspects, the disclosure relates to a system that includes a vector controller configured to generate a user vector, a selection controller configured to select a time period, and an application executing on one or more servers. The application is configured for aggregating, by a vector controller, a set of events, of a user, to generate the user vector in response to identifying an event of the set of events. The application is further configured for aggregating a set of user vectors to a periodic vector for a time period, wherein the set of user vectors includes the user vector. The application is further configured for processing a set of periodic vectors to generate a periodic distance, wherein the set of periodic vectors includes the periodic vector. The application is further configured for selecting the time period, corresponding to the periodic vector, using the periodic distance and a threshold. The application is further configured for processing the set of user vectors to generate clusters of user vectors, wherein the set of user vectors includes the event during the time period. The application is further configured for processing the clusters of user vectors to identify a selected cluster and performing an action to a set of user accounts corresponding to the selected cluster.

In general, in one or more aspects, the disclosure relates to a method of identifying clusters with anomaly detection. The method includes transmitting a request to access a service and receiving a response that the request is denied. An action to disable a user account was performed in response to aggregating a set of events, of a user, to generate a user vector in response to identifying an event of the set of events. The action was further performed in response to aggregating a set of user vectors to a periodic vector for a time period, wherein the set of user vectors includes the user vector. The action was further performed in response to processing a set of periodic vectors to generate a periodic distance, wherein the set of periodic vectors includes the periodic vector. The action was further performed in response to selecting the time period, corresponding to the periodic vector, using the periodic distance and a threshold. The action was further performed in response to processing the set of user vectors to generate clusters of user vectors, wherein the set of user vectors includes the event during the time period. The action was further performed in response to processing the clusters of user vectors to identify a selected cluster and performing an action to a set of user accounts corresponding to the selected cluster.

Other aspects of the invention will be apparent from the following description and the appended claims.

DETAILED DESCRIPTION

Figure 1:
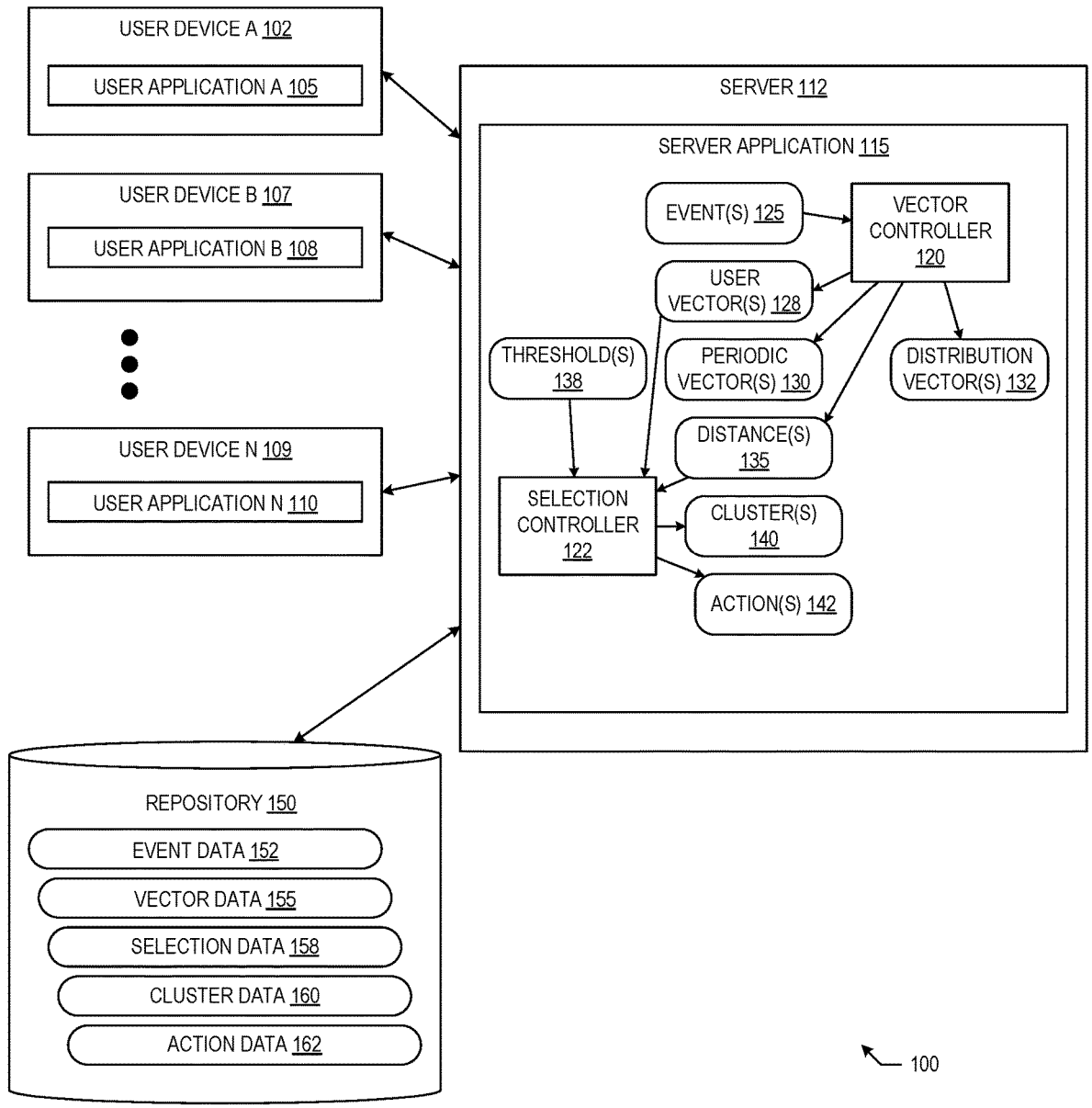
FIG. 1 shows a diagram of a system in accordance with disclosed embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure implement systems and methods that identify clusters with anomaly detection. The system scans for successful activity (e.g., account creation) and highlights suspected accounts that may be related to malicious activity. For example, a user successfully creates an account after multiple failures on a particular day. The system aggregates the events for the day to a periodic vector that is compared with the periodic vectors of previous days (e.g., the last 30 days). If the system determines that the day's activity is beyond a threshold, the system clusters user accounts that were created on that day. The system may then disable the user accounts in a cluster associated with malicious activity.

The figures show diagrams of embodiments that are in accordance with the disclosure. The embodiments of the figures may be combined and may include or be included within the features and embodiments described in the other figures of the application. The features and elements of the figures are, individually and as a combination, improvements to the technology of anomaly detection. The various elements, systems, components, and steps shown in the figures may be omitted, repeated, combined, and/or altered as shown from the figures. Accordingly, the scope of the present disclosure should not be considered limited to the specific arrangements shown in the figures.

Turning to FIG. 1, the system (100) identifies clusters with anomaly detection. Users interact with the system (100) by operating the user devices A (102) and B (107) through N (109), which communicate with the server (112). For example, users may attempt to create accounts to use services provided by the server (112). The system (100) processes the events generated by the devices and programs of the system (100) to detect anomalies and perform actions in response to the anomalies detected from the events (125). The system (100) includes the user devices A (102) and B (107) through N (109), the server (112), and the repository (150).

Figure 4A:
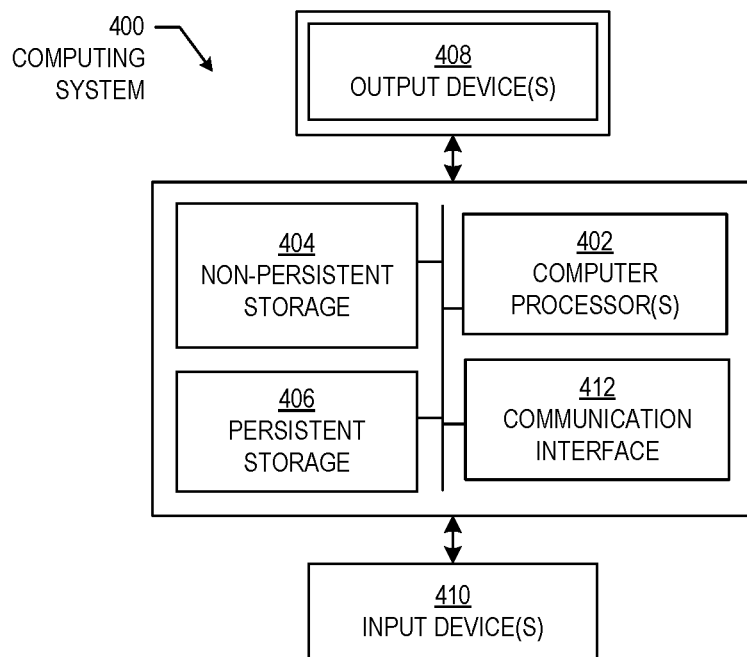
FIG. 4A and FIG. 4B show computing systems in accordance with disclosed embodiments.

The server (112) is a computing system (further described in FIG. 4A). The server (112) may include multiple physical and virtual computing systems that form part of a cloud computing environment. In one embodiment, execution of the programs and applications of the server (112) is distributed to multiple physical and virtual computing systems in the cloud computing environment. The server (112) includes the server application (115).

The server application (115) is a collection of programs that may execute on multiple servers of a cloud environment, including the server (112). The server application (115) processes the events (125) to identify the clusters (140) and may take the actions (142) in response to identifying the clusters (140). The server application (115) may host websites accessed by users of the user devices A (102) and B (107) through N (109) to access services. The websites hosted by the server application (115) may serve structured documents (hypertext markup language (HTML) pages, extensible markup language (XML) pages, JavaScript object notation (JSON) files and messages, etc.). The server application (115) includes the vector controller (120) and the selection controller (122).

The vector controller (120) is a collection of programs that may operate on the server (112). The vector controller (120) processes the events (125) to generate the user vectors (128), the periodic vectors (130), and the distribution vectors (132).

The events (125) are events generated by the programs of the system (100). The events (125) may be generated in response to interactions between the user devices A (102) and B (107) through N (109) and the services offered by the system (100). For example, the events (125) may include events generated by web browsers operating as the user applications A (105) and B (108) through N (110) on the user devices A (102) and B (107) through N (109) and include events generated by server applications (including the server application (115)) responding to requests from the user devices A (102) and B (107) through N (109).

The events (125) may be stored as the event data (152) in the repository (150). An event may be stored as a data record with multiple fields for data and metadata about the event. For example, a data record of an event may include fields for a timestamp, an event identifier, data about the devices used to generate the event, an identifier for the user, etc.

The timestamp may include a date and time the event was generated. In one embodiment, the timestamp made be a Unix time code. The event identifier may be unique to an event. The event identifier may differentiate the event from other events generated by the system (100).

The data about the devices may include hardware identifiers and software identifiers. The hardware identifiers may include model numbers, serial numbers, BIOS version numbers, etc. The software identifiers may include version numbers for operating systems and applications. The user identifier identifies a user of the system (100). In one embodiment, the user identifier may include an email address.

Continuing with FIG. 1, the user vectors (128) are generated from the events (125). A user vector, of the user vectors (128), may aggregate multiple events from the events (125). The user vectors (128) may have a different number of dimensions than the number of fields from the events (125). In one embodiment, the user may attempt to create an account using different devices that use different operating systems. The different events may be aggregated into a single user vector with fields that indicate an attempt was made. For example, the fields from two events below show the same user attempting to access the system (100) at different times using different operating system (OS) versions.

| User Identifier | Used OS version 1 | Used OS version 2 |
| --- | --- | --- |
| Lex.Luthor@mail.com | 1 | 0 |
| Lex.Luthor@mail.com | 0 | 1 |

The two events above may be aggregated into a single user vector shown below. The single user vector shown below includes aggregated values for the two fields from the two events above by selecting the maximum value. Different aggregation algorithms may be used including maximum value, minimum value, average value, count of values, etc.

| User Identifier | Used OS version 1 (aggregated value) | Used OS version 2 (aggregated value) |
| --- | --- | --- |
| Lex.Luthor@mail.com | 1 | 1 |

Continuing with FIG. 1, the periodic vectors (130) are aggregations of the events (125). In one embodiment, the periodic vectors (130) are generated by aggregating a set of the user vectors (128). The periodic vectors (130) may have the same number of dimensions as the user vectors (128). A periodic vector of the periodic vectors (130) may be generated by aggregating a set of the user vectors (128) that correspond to a periodic basis. The periodic basis may be a length of time and may be one hour, one day, one week, etc.

The distribution vectors (132) are aggregations of the events (125). In one embodiment, the distribution vectors (132) are generated by aggregating a set of the periodic vectors (130). The distribution vectors (132) may have the same number of dimensions as the periodic vectors (130). A distribution vector of the distribution vectors (132) may be generated by aggregating a set of the periodic vectors (130) that correspond to a periodic duration. The periodic duration may be a length of time that is longer than the periodic basis. The periodic duration may be one day, one week, one month, etc.

The distances (135) are comparisons of the periodic vectors (130) to the distribution vectors (132). The distances (135) may be generated by using a distance algorithm to identify a scalar value of the distance between one periodic vector and a corresponding distribution vector. A periodic vector may correspond to a distribution vector when the periodic basis of the periodic vector occurs within the periodic duration of the distribution vector. Distance algorithms that may be used include Mahalanobis distance, Euclidean distance, Bhattacharyya distance, Hamming distance, etc.

The selection controller (122) is a collection of programs that may operate on the server (112). The selection controller (122) processes the distances (135) to select some of the periodic vectors (130) using the thresholds (138), processes the user vectors (128) to generate the clusters (140) using the selections of the periodic vectors (130), and processes the clusters (140) to perform the actions (142). A periodic vector (of the periodic vectors (130)) may be selected when the distance (of the distances (135)) corresponding to the periodic vector satisfies a threshold of the thresholds (138).

The thresholds (138) identify the values of the distances (135) that are used for selecting the periodic vectors (130). In one embodiment, a threshold may be based on a standard deviation of distances. For example, the standard deviation may be taken from a set of periodic vectors with periodic bases within the periodic duration of a distribution vector. A multiple of the standard deviation (1.2, 1.5, 2.1, etc.) may be used as a threshold. When one of the distances (135) satisfies a corresponding one of the thresholds (138) (e.g., by exceeding the threshold) then the periodic vector corresponding to the distance may be selected.

The clusters (140) are groups of the user vectors (128) that correspond to the periodic vectors (130) that have been selected. For example, when a periodic vector is selected, the user vectors that make up the periodic vector may be clustered. A cluster of user vectors, for a periodic vector, is a collection of similar user vectors. Clustering algorithms that may be used include density-based spatial clustering of applications with noise (DBSCAN), K-means clustering, etc. Clustering may use a threshold on the number of clusters or a threshold on the distances between user vectors in a cluster to identify when the process of clustering is complete.

The actions (142) are performed with respect to the user accounts corresponding to the user vectors (128) of the clusters (140). The actions may include disabling user accounts, removing user accounts, denying access to one or more services, etc. In one embodiment, the system may process the events (125) to identify account creation events used for malicious access attempts. In response to identifying user accounts (that correspond to the user vectors (128) in the clusters (140)), the system may disable or remove the accounts.

Continuing with FIG. 1, the user devices A (102) and B (107) through N (109) are computing systems (further described in FIG. 4A). For example, the user devices A (102) and B (107) through N (109) may be desktop computers, mobile devices, laptop computers, tablet computers, server computers, etc. The user devices A (102) and B (107) through N (109) include hardware components and software components that operate as part of the system (100). The user devices A (102) and B (107) through N (109) communicate with the server (112) to access, manipulate, and view services and information hosted by the system (100). The user devices A (102) and B (107) through N (109) may communicate with the server (112) using standard protocols and file types, which may include hypertext transfer protocol (HTTP), HTTP secure (HTTPS), transmission control protocol (TCP), internet protocol (IP), hypertext markup language (HTML), extensible markup language (XML), etc. The user devices A (102) and B (107) through N (109) respectively include the user applications A (105) and B (108) through N (110).

The user applications A (105) and B (108) through N (110) may each include multiple programs respectively running on the user devices A (102) and B (107) through N (109). The user applications A (105) and B (108) through N (110) may be native applications, web applications, embedded applications, etc. In one embodiment, the user applications A (105) and B (108) through N (110) include web browser programs that display web pages from the server (112).

As an example, the user application A (105) may be used by a user to create an account to access services offered by the system (100). After creating the account, the user may login and access the services. Some users may attempt to create accounts and maliciously access the services hosted by the system (100). If the system processes the events (125) and a user is identified as attempting malicious access to the system (100), access to the system (100) and the account of the user may be disabled.

The repository (150) is a computing system that may include multiple computing devices in accordance with the computing system (400) and the nodes (422) and (424) described below in FIGS. 4A and 4B. The repository (150) may be hosted by a cloud services provider that also hosts the server (112). The cloud services provider may provide hosting, virtualization, and data storage services as well as other cloud services to operate and control the data, programs, and applications that store and retrieve data from the repository (150). The data in the repository (150) includes the event data (152), the vector data (155), the selection data (158), the cluster data (160), and the action data (162).

The event data (152) includes the data records for the events (125). The event data may be stored in a database. The event data (152) may be accessed using tables with rows for the events and columns for the fields of the events. The vector data (155) includes the data records for the user vectors (128), the periodic vectors (130), and the distribution vectors (132). The vector data (155) is intermediate data generated from the events (125) (i.e., the event data (152)) and processed to identify the clusters (140) and actions (142). The selection data (158) is data used by the selection controller (122). The selection data (158) includes the thresholds (138) and the logic used by the selection controller (122).

Continuing with FIG. 1, the cluster data (160) is data of the clusters (140). The cluster data (160) identifies groups of similar user vectors (including the user vectors (128)) and corresponding accounts. The action data (162) is data that defines the actions (142). The action data (162) may include instructions that are executed in response to identifying malicious access attempts from the events (125).

Although shown using distributed computing architectures and systems, other architectures and systems may be used. In one embodiment, the server application (115) may be part of a monolithic application that implements experiment result networks. In one embodiment, the user applications A (105) and B (108) through N (110) may be part of monolithic applications that implement experiment result networks without the server application (115).

Figure 2:
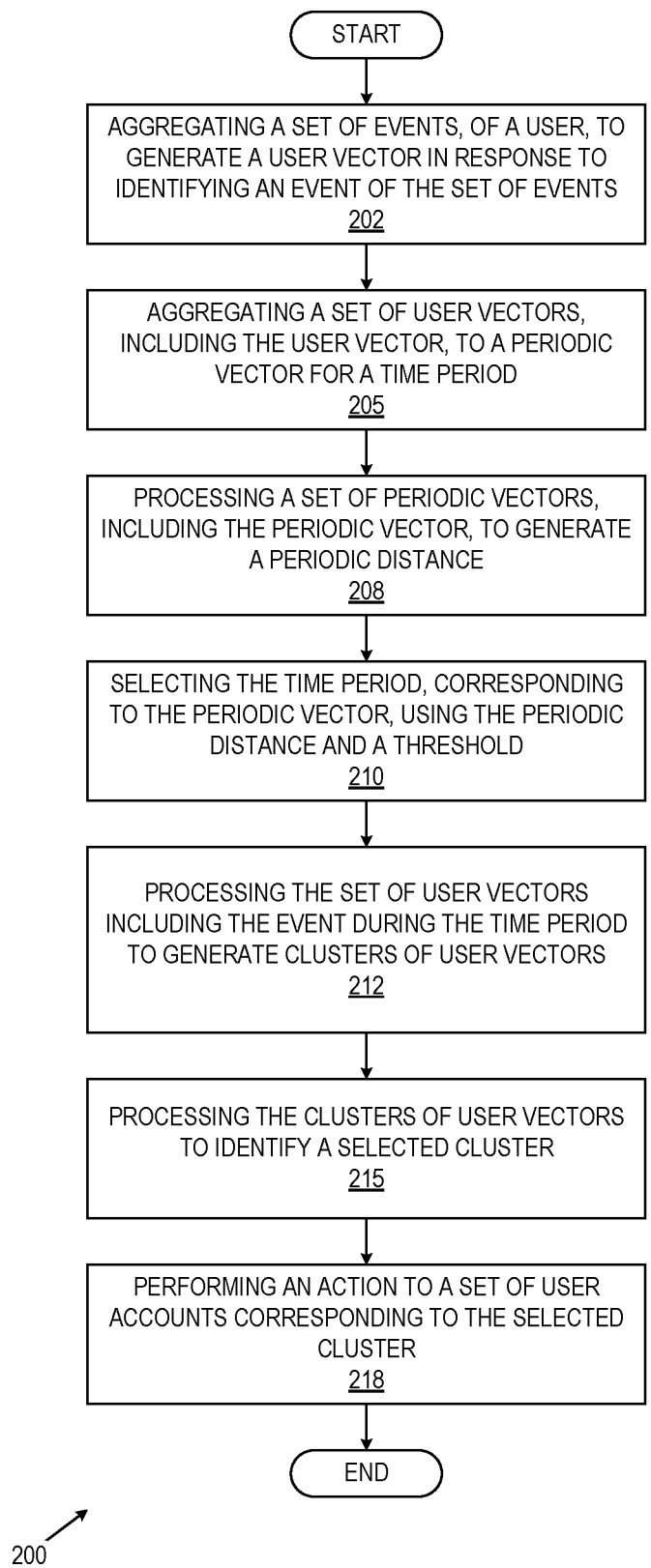
FIG. 2 shows a flowchart in accordance with disclosed embodiments.

Turning to FIG. 2, the process (200) identifies clusters with anomaly detection. The process (200) may be performed by a server.

At Step 202, a set of events, of a user, is aggregated to generate a user vector in response to identifying an event of the set of events. In one embodiment, the event is an account creation event and the system may identify a set of events that includes a successful account creation event that is preceded by one or more unsuccessful account creation events. The set of events (including the successful event and the unsuccessful events) for the same user may be aggregated to a user vector. The system may identify a set of columns from the set of events that are aggregated to form the user vector so that the user vector may have a different number of dimensions than the number of fields for the events. Different algorithms may be used to aggregate the values of a field present in the records of these sub events. The value of a dimension of a user vector may be the average, count, maximum value, minimum value, etc., of the values of the fields from the records of the events. For example, a binary variable from a field of multiple events may be averaged to a continuous value between 0 and 1 for a dimension of a user vector.

For fields with binary values, logical operations may be used to combine the different values to form the value and the user vector. For example, a logical OR may be used to combine the values of fields from multiple events so that if any event has a value of true, then the value of true will be present in the value of the dimension of the user vector that corresponds to the field of the events.

In one embodiment, the set of events includes one or more failed requests of a request type and at least one successful request of the request type. Types of requests that may be analyzed by the system include account creation requests, service access requests, data access requests, etc.

The user vector may include different types of variables including binary variables, categorical variables, discrete variables, continuous variables, etc. In one embodiment, the user vector includes a set of binary variables that identify event attributes. The event attributes may include information about device features, server features, and service features. The device features identify characteristics related to a user device, which may include information about client operating systems and versions, client applications and versions, locations, internet protocol (IP) addresses, etc. The server features identify characteristics related to a server and may include information about server operating systems and versions, server applications and versions, locations, internet protocol (IP) addresses, etc. The service features identify characteristics related to accessing a service and may include information about the time of access, the product accessed, the type of access, etc.

At Step 205, a set of user vectors is aggregated to a periodic vector for a time period. In one embodiment, the set of user vectors is aggregated on a periodic basis. In one embodiment, the periodic basis is one of hourly, daily, weekly, and monthly. For example, the system may, on a daily basis, aggregate the events that occurred during the day to a set of user vectors.

At Step 208, a set of periodic vectors is processed to generate a periodic distance. In one embodiment, a set of periodic vectors are combined to form a distribution vector. The periodic distance may be between a periodic vector and the distribution vector.

In one embodiment, the set of periodic vectors is processed over a periodic duration. The periodic duration may be greater than a periodic basis used to aggregate the set of user vectors. For example, the periodic duration may be thirty (30) days with a periodic basis of one (1) day. A periodic vector may be generated for each day of the thirty (30) day periodic duration to form the set of periodic vectors. Different lengths of time may be used for the periodic basis and the periodic duration.

In one embodiment, the periodic distance is generated using a Mahalanobis distance algorithm between the periodic vector and the set of periodic vectors. For example, the combination may be performed by determining distributions for the dimensions of the periodic vectors. A dimension of the distribution vector may be the distribution of a corresponding dimension of the set of periodic vectors. In one embodiment, the values from the periodic vectors for a dimension may be averaged to generate the value for the dimension for the distribution vector.

A set of periodic distances may be generated for the set of periodic vectors that determine the distances from the periodic vectors to the distribution vector. The distance between a periodic vector and the distribution vector may be a Euclidean distance with a scalar value.

At Step 210, a time period, corresponding to the periodic vector, is selected using the periodic distance and a threshold. In one embodiment, the periodic vector corresponds to a current periodic basis. For example, when the periodic basis is a daily basis, the periodic vector generated for the most recent day corresponds to the time period selected. The threshold may be a multiple (0.8, 1.0, 1.3, etc.) of a standard deviation. The standard deviation may be the standard deviation of the set of distances generated for the set of periodic vectors. Different algorithms may be used to determine the threshold.

At Step 212, the set of user vectors for the time period is processed to generate clusters of user vectors. After selecting the time period, the system processes the user vectors that correspond to the time period, which include events that occurred during the time period. The system processes the user vectors to cluster the user vectors into groups of similar user vectors. In one embodiment, the clusters of user vectors may be generated by using a DBSCAN algorithm Different clustering algorithms may be used, including K-means clustering.

At Step 215, the clusters of user vectors are processed to identify a selected cluster. The selected cluster may be an anomalous cluster, which may correspond to attempts to access the system without authorization. In one embodiment, the values of the dimensions of a user vector are combined using a weighted sum. The user represented by the user vector with the largest weighted sum of dimension values may be identified as lacking authorization to access the system along with the users of the user vectors that are in the same cluster (i.e., the anomalous cluster) as the user vector with the largest weighted sum of dimension values.

At Step 218, an action is performed to a set of user accounts corresponding to the selected cluster. In one embodiment, the set of user accounts includes the user accounts that correspond to the user vectors of the anomalous cluster. In one embodiment, the action includes disabling the set of user accounts. In one embodiment, access to a service may be denied responsive to disabling the set of user accounts.

Figure 3A:
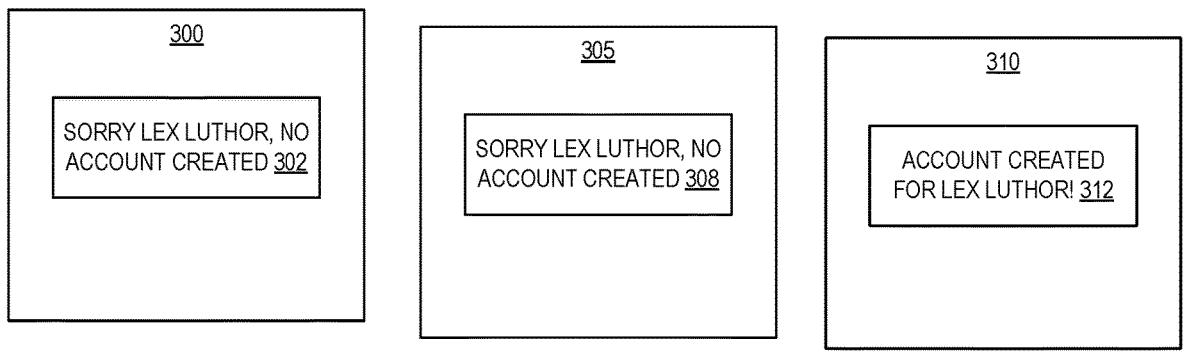
FIG. 3A, FIG. 3B, and FIG. 3C show examples in accordance with disclosed embodiments.
Figure 3B:
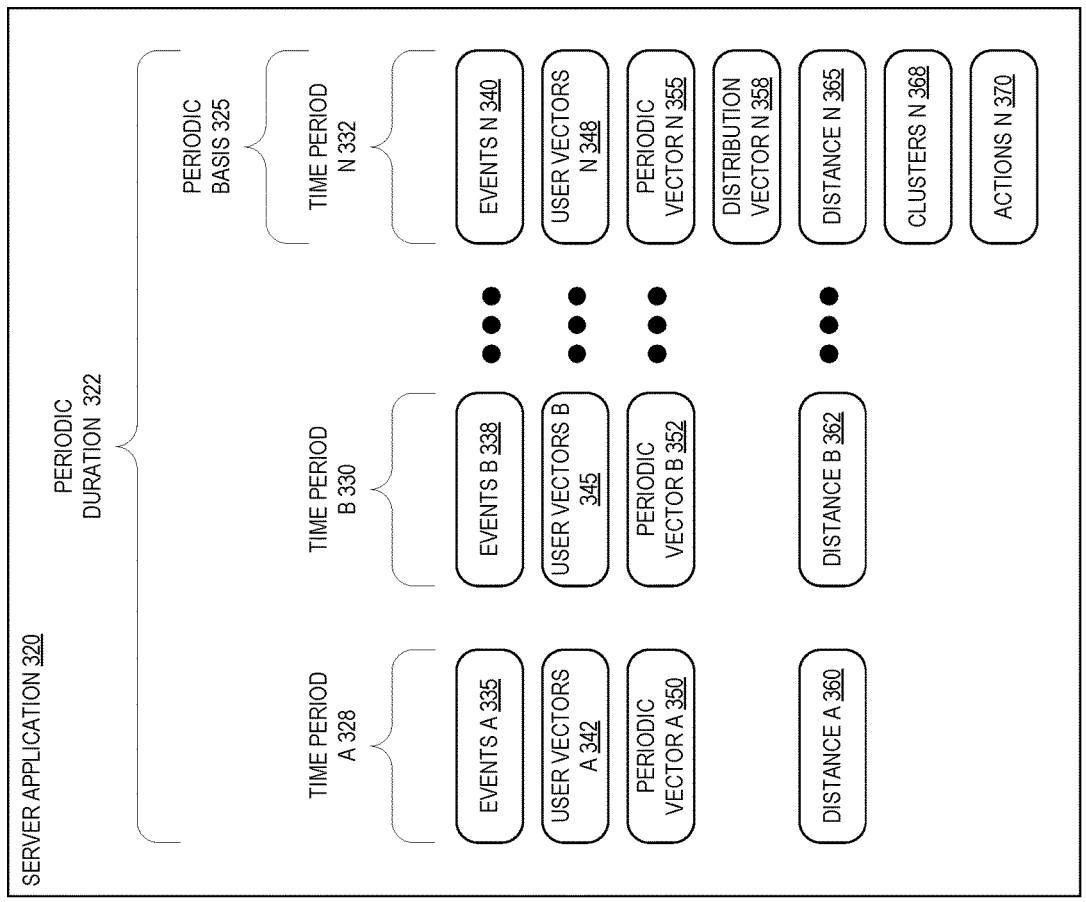
Figure 3C:
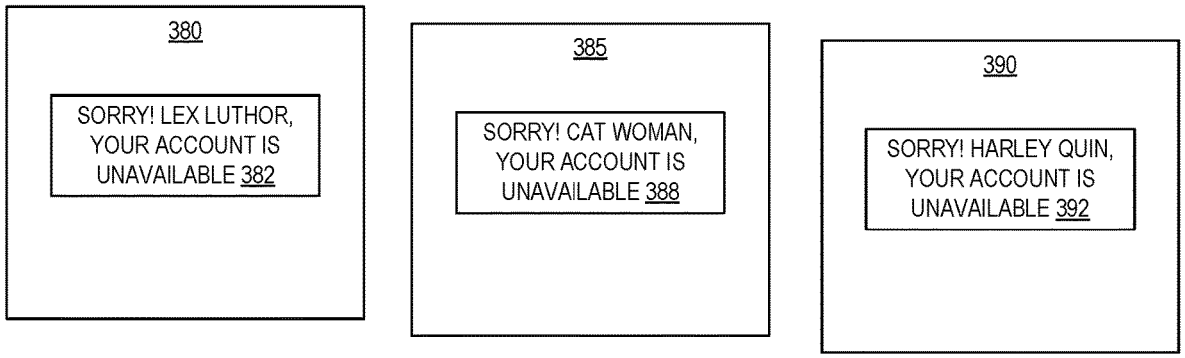

FIG. 3A, FIG. 3B, and FIG. 3C provide an example of a system that identifies clusters with anomaly detection. Unbeknownst to the system, a group of supervillains including Lex Luthor, Cat Woman, and Harley Quin, are attempting to access the system.

Turning to FIG. 3A, Lex Luthor's initial attempts to create an account during a time period. His first and second attempts are thwarted but his third attempt is successful. The user interface (300) displays the message (302). The message (302) indicates the first attempt to create an account was unsuccessful. The user interface (305) displays the message (308) indicating the second attempt to create an account was also unsuccessful. Between the first and second attempts, Lex changed various aspects of the device and software he is using to log into the system. For example, different IP addresses may have been used. The user interface (310) displays the message (312) indicating the third attempt to create an account was successful. Lex has found a successful combination of hardware and software configurations to access the system and create an account.

Turning to FIG. 3B, the server application (320) analyzes events to prevent unauthorized access to the system. The server application (320) analyzes events over the periodic duration (322). The periodic duration (322) identifies the length of time over which events are analyzed. The periodic duration (322) here may be 30 days. Different durations may be used based on the types of events being processed. The periodic duration is greater than the periodic basis (325). The periodic basis (325) is a length of time over which events are aggregated. The periodic basis (325) is 1 day (24 hours). Different bases may be used that are based on the types of events being processed. The periodic basis (325) corresponds to multiple time periods A (328) and B (330) through N (332). The time periods A (328) and B (330) through N (332) are different time periods within the periodic duration (322) having a length of the periodic basis (325). For example, the time periods A (328) and B (330) through N (332) may be 1 day long and correspond to the 30 days in the periodic duration (322). The system analyzes the events N (340) of the time period N (332) after the close of the time period N (332).

The events N (340) are the events that occurred during the time period N (332). The events N (340) include the interactions with the devices operated by Lex Luthor and the other supervillains to create accounts with the system. The events N (340) may be used to generate the user vectors N (348).

The user vectors N (348) are aggregations of the events N (340). The events N (340) are aggregated on a per user basis and may include one or more columns of data from the events N (340) as dimensions in the user vectors. Categorical values from the events N (340) may be converted to multiple dummy variables having binary values. One of the user vectors N (348) aggregates the two unsuccessful attempts and one successful attempt to create an account by Lex Luthor. The user vectors N (348) may be used to create the periodic vector N (355).

The periodic vector N (355) is an aggregation of the events N (340) for the time period N (332). The periodic vector N (355) may be generated from the events N (340) or from the user vectors N (348). The periodic vector N (355) may have the same number of dimensions as the user vectors N (348). In one embodiment, a value of a dimension of the periodic vector N (355) may be an expectation (e.g., a probability of a binary variable being true) of a value for a dimension from the user vectors N (348). A value of a dimension may be an average value (e.g., of a continuous variable). The periodic vector N (355) may be used to create the distribution vector N (358).

Continuing with FIG. 3B, the distribution vector N (358) is an aggregation of the events A (335) and B (338) through N (340). The distribution vector N (358) may be generated from the periodic vectors A (350) and B (352) through N (355), from the user vectors A (342) and B (345) through N (348), from the events A (335) and B (338) through N (340), etc. A value of a dimension of the distribution vector N (358) is a distribution of the values for that dimension from the periodic vectors A (350) and B (352) through N (355) (and the user vectors A (342) and B (345) through N (348)). The distribution vector N (358) is generated over the time periods A (328) and B (330) through N (332).

The time period A (328) is the first time period of the periodic duration (322). During the time period A (328) the events A (335) occurred. The user vectors A (342) and the periodic vector A (350) are generated from the events A (335). The time period B (330) is the second time period of the periodic duration (322). During the time period B (330) the events B (338) occurred. The user vectors B (345) and the periodic vector B (352) are generated from the events B (338). The time period N (332) is the last time period of the periodic duration (322). During the time period N (332) the events N (340) occurred. The user vectors N (348) and the periodic vector N (355) are generated from the events N (340). The periodic vector N (355) is used to generate the distance N (365).

The distance N (365) is the distance from the periodic vector N (355) to the distribution vector N (358). The distance N (365) may be calculated using the Mahalanobis distance algorithm. The distances A (360) and B (362) are the respective distances from the periodic vectors A (350) and B (352) to the distribution vector N (358).

The time period N (332) is selected when the distance N (365) satisfies a threshold. The threshold may be the standard deviation (or multiple thereof) of the distances A (360) and B (362) through N (365). For example, if the distance N (365) is larger than the threshold, the time period N (332) is selected for further processing to generate the clusters N (368).

The clusters N (368) are clusters of the user vectors N (348) for the events N (340) of the time period N (332). The clusters N (368) may be generated using the DBSCAN algorithm on the user vectors N (348) or on the events N (340). The clusters N (368) identify similar groups of users.

In this case, the system identifies a cluster that includes Lex Luthor, Cat Woman, and Harley Quinn. The cluster is selected as an anomalous cluster in which at least one of the items within the cluster (e.g., one of the user vectors) has a weighted sum indicating that the access attempts associated with the item may be unauthorized. The actions N (370) may be performed on the user accounts associated with the selected cluster.

The actions N (370) are the actions taken in response to identifying an anomalous cluster. The actions N (370) include disabling the accounts of Lex Luthor, Cat Woman, and Harley Quinn. The account of Lex Luthor is disabled because it corresponds to a user vector identified including events identified as attempting unauthorized access. The accounts of Cat Woman and Harley Quinn are disabled because their events or user vectors were in the same cluster as that of Lex Luthor.

Turning to FIG. 3C, the account of Lex Luther has been disabled. The accounts of the other supervillains Cat Woman and Harley Quinn have also been disabled. The user interface (380) displays the message (382). The message (382) indicates that the account of Lex Luthor is disabled. The user interface (385) displays the message (388) indicating the account of Cat Woman is disabled. The account of Cat Woman is disabled because the events or user vector corresponding to Cat Woman were clustered with the events or user vector of Lex Luthor. The user interface (392) displays the message (395) indicating the account of Harley Quinn is disabled. The account of Harley Quinn is disabled because the events or user vector corresponding to Harley Quinn were also clustered with the events or user vector of Lex Luthor.

Embodiments of the invention may be implemented on a computing system. Any combination of a mobile, a desktop, a server, a router, a switch, an embedded device, or other types of hardware may be used. For example, as shown in FIG. 4A, the computing system (400) may include one or more computer processor(s) (402), non-persistent storage (404) (e.g., volatile memory, such as a random access memory (RAM), cache memory), persistent storage (406) (e.g., a hard disk, an optical drive such as a compact disk (CD) drive or a digital versatile disk (DVD) drive, a flash memory, etc.), a communication interface (412) (e.g., Bluetooth interface, infrared interface, network interface, optical interface, etc.), and numerous other elements and functionalities.

The computer processor(s) (402) may be an integrated circuit for processing instructions. For example, the computer processor(s) (402) may be one or more cores or micro-cores of a processor. The computing system (400) may also include one or more input device(s) (410), such as a touchscreen, a keyboard, a mouse, a microphone, a touchpad, an electronic pen, or any other type of input device.

The communication interface (412) may include an integrated circuit for connecting the computing system (400) to a network (not shown) (e.g., a local area network (LAN), a wide area network (WAN) such as the Internet, a mobile network, or any other type of network) and/or to another device, such as another computing device.

Further, the computing system (400) may include one or more output device(s) (408), such as a screen (e.g., a liquid crystal display (LCD), a plasma display, a touchscreen, a cathode ray tube (CRT) monitor, a projector, or other display device), a printer, an external storage, or any other output device. One or more of the output device(s) (408) may be the same or different from the input device(s) (410). The input and output device(s) (410 and (408)) may be locally or remotely connected to the computer processor(s) (402), non-persistent storage (404), and persistent storage (406). Many different types of computing systems exist, and the aforementioned input and output device(s) (410 and (408)) may take other forms.

Software instructions in the form of computer readable program code to perform embodiments of the invention may be stored, in whole or in part, temporarily or permanently, on a non-transitory computer readable medium such as a CD, a DVD, a storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (400) in FIG. 4A may be connected to or be a part of a network. For example, as shown in FIG. 4B, the network (420) may include multiple nodes (e.g., node X (422), node Y (424)). Each node may correspond to a computing system, such as the computing system (400) shown in FIG. 4A, or a group of nodes combined may correspond to the computing system (400) shown in FIG. 4A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (400) may be located at a remote location and connected to the other elements over a network.

Figure 4B:
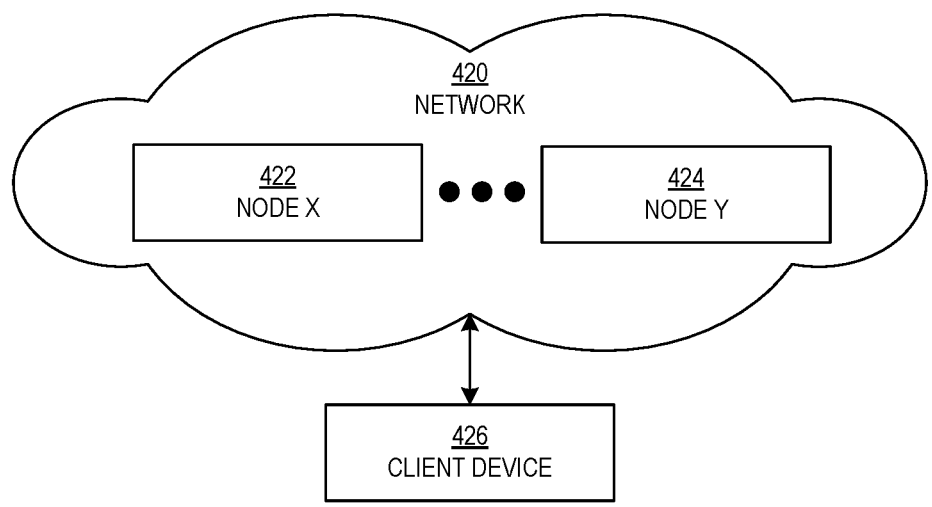

Although not shown in FIG. 4B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (422), node Y (424)) in the network (420) may be configured to provide services for a client device (426). For example, the nodes may be part of a cloud computing system. The nodes may include functionality to receive requests from the client device (426) and transmit responses to the client device (426). The client device (426) may be a computing system, such as the computing system (400) shown in FIG. 4A. Further, the client device (426) may include and/or perform all or a portion of one or more embodiments of the invention.

The computing system (400) or group of computing systems described in FIGS. 4A and 4B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until the server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data sharing techniques described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system (400) in FIG. 4A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system (400) of FIG. 4A, while performing one or more embodiments of the invention, may perform data comparison. Data comparison may be used to compare two or more data values (e.g., A, B). For example, one or more embodiments may determine whether $A>B$, $A=B$, $A\,!=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., $A-B$), and the status flags may be read to determine if the result is positive (i.e., if $A>B$, then $A-B>0$). In one or more embodiments, B may be considered a threshold, and A is deemed to satisfy the threshold if $A=B$ or if $A>B$, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (400) in FIG. 4A may implement and/or be connected to a data repository. For example, one type of data repository is a database. A database is a collection of information configured for ease of data retrieval, modification, re-organization, and deletion. A Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g., join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (400) of FIG. 4A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (400) of FIG. 4A and the nodes (e.g., node X (422), node Y (424)) and/or client device (426) in FIG. 4B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
   aggregating a set of events, of a user, to generate a user vector in response to identifying an event of the set of events, wherein the user vector comprises event attributes comprising device features identifying one or more characteristics related to a user device, server features identifying one or more characteristics related to a server, and service features identifying one or more characteristics related to accessing a service;
   aggregating a set of user vectors to a periodic vector for a time period, wherein the set of user vectors comprises the user vector;
   processing a set of periodic vectors to generate a periodic distance, wherein the set of periodic vectors comprises the periodic vector;
   selecting the time period, corresponding to the periodic vector, using the periodic distance and a threshold;
   processing the set of user vectors to generate clusters of user vectors, wherein the set of user vectors comprises the event during the time period;
   processing the clusters of user vectors to identify a selected cluster; and
   performing an action to a set of user accounts corresponding to the selected cluster.

2. The method of claim 1, further comprising:
   performing the action comprising disabling the set of user accounts; and
   denying access to a service responsive to disabling the set of user accounts.

3. The method of claim 1, further comprising:
   tracking events triggered by requests from user devices.

4. The method of claim 1, further comprising:
   aggregating the set of events, wherein the set of events comprises one or more failed requests of a request type and at least one successful request of the request type.

5. The method of claim 1, further comprising:
   aggregating the set of events,
      wherein the user vector comprises a set of binary variables,
      wherein the binary variables identify the event attributes.

6. The method of claim 1, further comprising:
   aggregating the set of user vectors to the periodic vector,
      wherein the set of user vectors are aggregated on a periodic basis, and
      wherein the periodic basis is one of hourly, daily, weekly, and monthly.

7. The method of claim 1, further comprising:
   processing the set of periodic vectors,
      wherein the set of periodic vectors are processed over a periodic duration, and
      wherein the periodic duration is greater than a periodic basis used to aggregate the set of user vectors.

8. The method of claim 1, further comprising:
   generating the periodic distance using a Mahalanobis distance algorithm between the periodic vector and the set of periodic vectors.

9. The method of claim 1, further comprising:
   generating the clusters of user vectors by using a density-based spatial clustering of applications with noise (DBSCAN) algorithm.

10. A system comprising:
    at least one computer processor;

a vector controller configured to generate a user vector;
a selection controller configured to select a time period;
an application executing on the at least one computer processor of one or more servers and configured for:
aggregating, by the vector controller, a set of events, of a user, to generate the user vector in response to identifying an event of the set of events, wherein the user vector comprises event attributes comprising device features identifying a characteristic related to a user device, server features identifying a characteristic related to a server, and service features identifying a characteristic related to accessing a service;
aggregating a set of user vectors to a periodic vector for the time period, wherein the set of user vectors comprises the user vector;
processing a set of periodic vectors to generate a periodic distance, wherein the set of periodic vectors comprises the periodic vector;
selecting, by the selection controller, the time period, corresponding to the periodic vector, using the periodic distance and a threshold;
processing the set of user vectors to generate clusters of user vectors, wherein the set of user vectors comprises the event during the time period;
processing the clusters of user vectors to identify a selected cluster; and
performing an action to a set of user accounts corresponding to the selected cluster.

11. The system of claim 10, wherein the application is further configured for:
performing the action comprising disabling the set of user accounts; and
denying access to a service responsive to disabling the set of user accounts.

12. The system of claim 10, wherein the application is further configured for:
tracking events triggered by requests from user devices.

13. The system of claim 10, wherein the application is further configured for:
aggregating the set of events, wherein the set of events comprises one or more failed requests of a request type and at least one successful request of the request type.

14. The system of claim 10, wherein the application is further configured for:
aggregating the set of events,
wherein the user vector comprises a set of binary variables,
wherein the binary variables identify the event attributes.

15. The system of claim 10, wherein the application is further configured for:
aggregating the set of user vectors to the periodic vector,
wherein the set of user vectors are aggregated on a periodic basis, and
wherein the periodic basis is one of hourly, daily, weekly, and monthly.

16. The system of claim 10, wherein the application is further configured for:
processing the set of periodic vectors,
wherein the set of periodic vectors are processed over a periodic duration, and
wherein the periodic duration is greater than a periodic basis used to aggregate the set of user vectors.

17. The system of claim 10, wherein the application is further configured for:
generating the periodic distance using a Mahalanobis distance algorithm between the periodic vector and the set of periodic vectors.

18. The system of claim 10, wherein the application is further configured for:
generating the clusters of user vectors by using a density-based spatial clustering of applications with noise (DBSCAN) algorithm.

19. A method comprising:
transmitting a request to access a service;
receiving a response that the request is denied, in which an action to disable a user account was performed in response to:
aggregating a set of events, of a user, to generate a user vector in response to identifying an event of the set of events, wherein the user vector comprises event attributes comprising device features identifying one or more characteristics related to a user device, server features identifying one or more characteristics related to a server, and service features identifying one or more characteristics related to accessing a service;
aggregating a set of user vectors to a periodic vector for a time period, wherein the set of user vectors comprises the user vector;
processing a set of periodic vectors to generate a periodic distance, wherein the set of periodic vectors comprises the periodic vector;
selecting the time period, corresponding to the periodic vector, using the periodic distance and a threshold;
processing the set of user vectors to generate clusters of user vectors, wherein the set of user vectors comprises the event during the time period;
processing the clusters of user vectors to identify a selected cluster; and
performing the action to a set of user accounts corresponding to the selected cluster, wherein the set of user accounts comprises the user account.

20. The method of claim 19, in which the action to disable the user account was further performed in response to:
aggregating the set of events, wherein the set of events comprises one or more failed requests of a request type and at least one successful request of the request type.

* * * * *